United States Patent
Yoshizawa

(10) Patent No.: US 8,842,132 B2
(45) Date of Patent: Sep. 23, 2014

(54) GRAPHIC DISPLAY APPARATUS, GRAPHIC DISPLAY METHOD AND RECORDING MEDIUM IN WHICH GRAPHIC DISPLAY PROGRAM IS RECORDED

(75) Inventor: Hiroaki Yoshizawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 245 days.

(21) Appl. No.: 13/352,557

(22) Filed: Jan. 18, 2012

(65) Prior Publication Data

US 2012/0188274 A1    Jul. 26, 2012

(30) Foreign Application Priority Data

Jan. 26, 2011 (JP) .................... 2011-013568
Jun. 28, 2011 (JP) .................... 2011-142709

(51) Int. Cl.
| | | |
|---|---|---|
| G09G 5/00 | (2006.01) | |
| G06F 15/02 | (2006.01) | |
| G06F 15/04 | (2006.01) | |
| G06T 11/60 | (2006.01) | |
| G06T 7/60 | (2006.01) | |

(52) U.S. Cl.
CPC ............ *G06T 11/60* (2013.01); *G06T 7/602* (2013.01)
USPC ........................ 345/629; 345/619; 708/130

(58) Field of Classification Search
USPC .......... 345/629, 440, 441, 421, 619, 442; 382/195; 708/130
See application file for complete search history.

(56) References Cited

U.S. PATENT DOCUMENTS

| | | |
|---|---|---|
| 5,245,559 A | 9/1993 | Lapeyre |
| 5,870,319 A | 2/1999 | Thornton et al. |
| 6,081,819 A | 6/2000 | Ogino |
| 6,104,411 A | 8/2000 | Ito et al. |

(Continued)

FOREIGN PATENT DOCUMENTS

| | | |
|---|---|---|
| EP | 1 229 498 A2 | 8/2002 |
| JP | 2003-131655 A | 5/2003 |

(Continued)

OTHER PUBLICATIONS

U.S. Appl. No. 13/426,994; First Named Inventor: Hiromi Yamaguchi; Title: "Electronic Device Which Renders Graph, Graph Display Method and Recording Medium in Which Graph Rendering Program is Recorded"; filed Mar. 22, 2012.

(Continued)

*Primary Examiner* — Joni Richer
*Assistant Examiner* — Yi Yang
(74) *Attorney, Agent, or Firm* — Holtz Holtz Goodman & Chick PC

(57) ABSTRACT

Disclosed is a graphic display apparatus including a display unit, a reference object length storage unit in which specified parts of reference objects and actual lengths of the specified parts are stored, an image storage unit in which images are stored, an image display control unit which displays a specified image which is specified based on a user's operation in the display unit, a specified image part setting unit which detects a specified part of a reference object in the specified image and sets the detected specified part as a specified image part, a coordinate system setting unit which superimposes a coordinate system on the specified image and sets a display range of the coordinate system based on an actual length of the specified image part, and a graphic display control unit which superimposes and displays a graphic on the specified image.

9 Claims, 14 Drawing Sheets

(56) References Cited

U.S. PATENT DOCUMENTS

| | | | |
|---|---|---|---|
| 6,470,293 B1 | 10/2002 | Sudoh | |
| 6,992,685 B2 | 1/2006 | Hallbauer et al. | |
| 7,263,499 B2 | 8/2007 | Kunigita | |
| 7,777,744 B2 | 8/2010 | Wostrel | |
| 2002/0044160 A1* | 4/2002 | Wattenberg et al. | 345/764 |
| 2004/0227738 A1* | 11/2004 | Sudoh | 345/173 |
| 2007/0195093 A1 | 8/2007 | Springer et al. | |
| 2007/0227738 A1 | 10/2007 | Dennistoun et al. | |
| 2007/0239808 A1* | 10/2007 | Wostrel | 708/130 |
| 2008/0143746 A1 | 6/2008 | Irons | |
| 2009/0040340 A1* | 2/2009 | Nakase et al. | 348/231.3 |
| 2009/0219290 A1 | 9/2009 | Kakie | |
| 2009/0232363 A1* | 9/2009 | Ohashi et al. | 382/118 |
| 2012/0242690 A1 | 9/2012 | Yamaguchi | |

FOREIGN PATENT DOCUMENTS

| | | | |
|---|---|---|---|
| JP | 2003131655 | * | 5/2003 |
| JP | 2004-252815 A | | 9/2004 |
| JP | 2004252815 | * | 9/2004 |
| JP | 2005-010850 A | | 1/2005 |
| JP | 2008-042580 A | | 2/2008 |

OTHER PUBLICATIONS

Extended European Search Report (EESR) dated May 29, 2012 (in English) in counterpart European Application No. 12152422.7.
fx-CG10 fx-CG20 Software User's Guide.

* cited by examiner

GRAPHIC DISPLAY APPARATUS, GRAPHIC DISPLAY METHOD AND RECORDING MEDIUM IN WHICH GRAPHIC DISPLAY PROGRAM IS RECORDED

CROSS-REFERENCE TO RELATED APPLICATIONS

This application is based upon and claims the benefit of priority under 35 USC 119 of Japanese Patent Application No. 2011-013568 filed on Jan. 26, 2011 and Japanese Patent Application No. 2011-142709 filed on Jun. 28, 2011, the entire disclosure of which, including the description, claims, drawings, and abstract, is incorporated herein by reference in its entirety.

BACKGROUND OF THE INVENTION

1. Field of the Invention

The present invention relates to a graphic display apparatus which displays graphs or geometric figures, a graphic display method thereof and a recording medium in which a graphic display program is recorded.

2. Description of Related Art

Conventionally, there are graphic display apparatuses that allow photographed images to be displayed wherein scale marks corresponding to the actual size of the image are displayed in the image. However, in the conventional technique, an image and a graph (such as a graph and a geometric figure) cannot be displayed so as to be superimposed on each other by setting a display range corresponding to the size of a subject in the image.

SUMMARY OF THE INVENTION

An object of the present invention is to provide a graphic display apparatus which can set a display range corresponding to the size of a subject in an image and display the image and a graphic so as to be superimposed on each other, a graphic display method thereof and a recording medium in which the graphic display program thereof is recorded.

In order to solve the above object, according to a first aspect of the present invention, there is provided a graphic display apparatus including a display unit, a reference object length storage unit in which specified parts of reference objects and actual lengths of the specified parts are stored in such manner that the specified parts and the actual lengths of the specified parts are associated to each other, an image storage unit in which images are stored, an image display control unit which displays a specified image which is specified based on a user's operation among the images stored in the image storage unit in the display unit, a specified image part setting unit which detects a specified part of a reference object in the specified image and sets the detected specified part as a specified image part, a coordinate system setting unit which superimposes a coordinate system which is defined by coordinate axes on the specified image and sets a display range of the coordinate system based on an actual length of the specified image part in the specified image and a graphic display control unit which superimposes and displays a graphic on the specified image based on a user's operation.

DESCRIPTION OF THE PREFERRED EMBODIMENTS

Hereinafter, an example of embodiment according to the present invention will be described in detail with reference to the appended drawings. However, the scope of the invention is not limited to the illustrated examples.

1. Configuration of Scientific Electronic Calculator

[1-1. Exterior Configuration]

Figure 1:
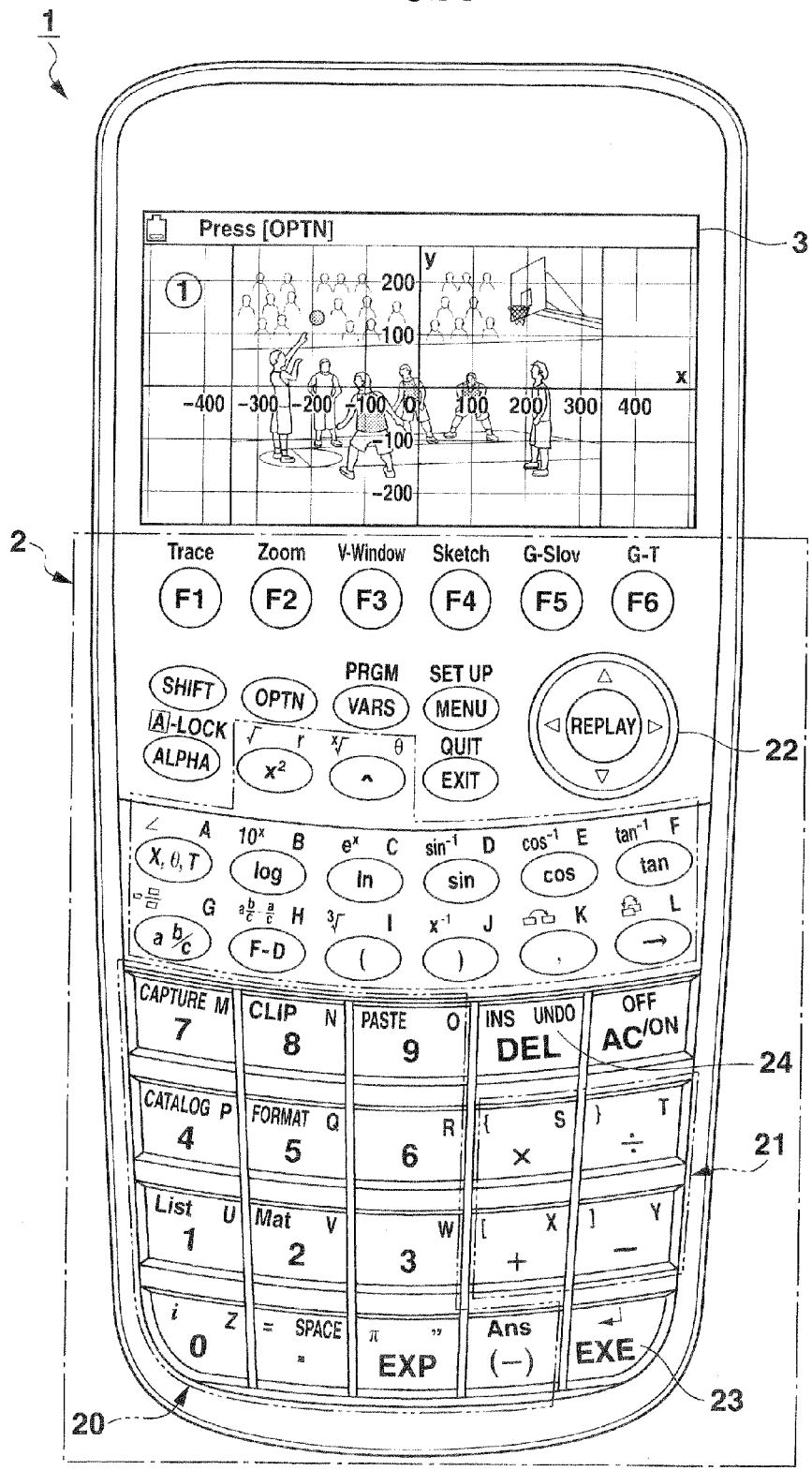
FIG. 1 is a plane view showing an outline configuration of a scientific electronic calculator.

FIG. 1 is a conceptual diagram showing an outline configuration of a scientific electronic calculator 1.

As shown in FIG. 1, the scientific electronic calculator 1 includes input key group 2 which includes groups of various types of keys and a display 3.

The input key group 2 is a group of keys for receiving input operations of formula components such as numeric values and arithmetic symbols made by a user and receiving instructional operations of various types of processing. The input key group 2 includes a plurality of keys, each of which is assigned with a specific function. In the embodiment, the input key group 2 includes numeric keys 20, arithmetic symbol keys 21, a cursor key 22, an EXE key 23, a delete key 24 and so forth.

Among the keys, the numeric keys 20 are keys for receiving input operations of numerical values, the arithmetic symbol keys 21 are keys for receiving input operations of various types of arithmetic symbols such as symbols of four arithmetic operations, parenthesis, the vinculum of a fraction, radical ($\sqrt{}$), logarithmic symbols, constant numbers (the circular constant "$\pi$", speed of light "c" and so forth), trigonometric function symbols and the like.

The cursor key 22 is a key which is pushed when moving the cursor indicating the position of editing subject or the position of selection subject in a predetermined direction within the display 3, and the cursor key 22 is configured to input the four directions which are up, down, right and left in the embodiment.

The EXE key 23 is a key to receive input operations such as execution instructions and decision instructions of processing, and for example, the EXE key 23 functions as a key to instruct execution of arithmetic processing after a function is input. The delete key 24 is a key for receiving operations to delete numeric values, arithmetic symbols and so forth which are displayed in the display 3.

The display 3 is constituted of a LCD (Liquid Crystal Display), an ELD (Electronic Luminescent Display) or the like, and displays characters, symbols, functions, arithmetic results, coordinate axes, graphs and so forth according to operations of the input key group 2 and the like and also displays various types of data which are required for using the scientific electronic calculator 1 in a plurality of dots. Here, in the display 3 of this embodiment, X-axis is displayed in horizontal direction and Y-axis is displayed in vertical direction to show an X-Y coordinate by the X and Y axes, and the number of dots in Y-axis direction and x-axis direction are "192" and "384", respectively. Further, on the display 3 of this embodiment, the touch panel 30 (see FIG. 2) is integrally provided across the entire display screen.

[1-2. Functional Configuration]

Next, functional configuration of the scientific electronic calculator 1 will be described.

Figure 2:
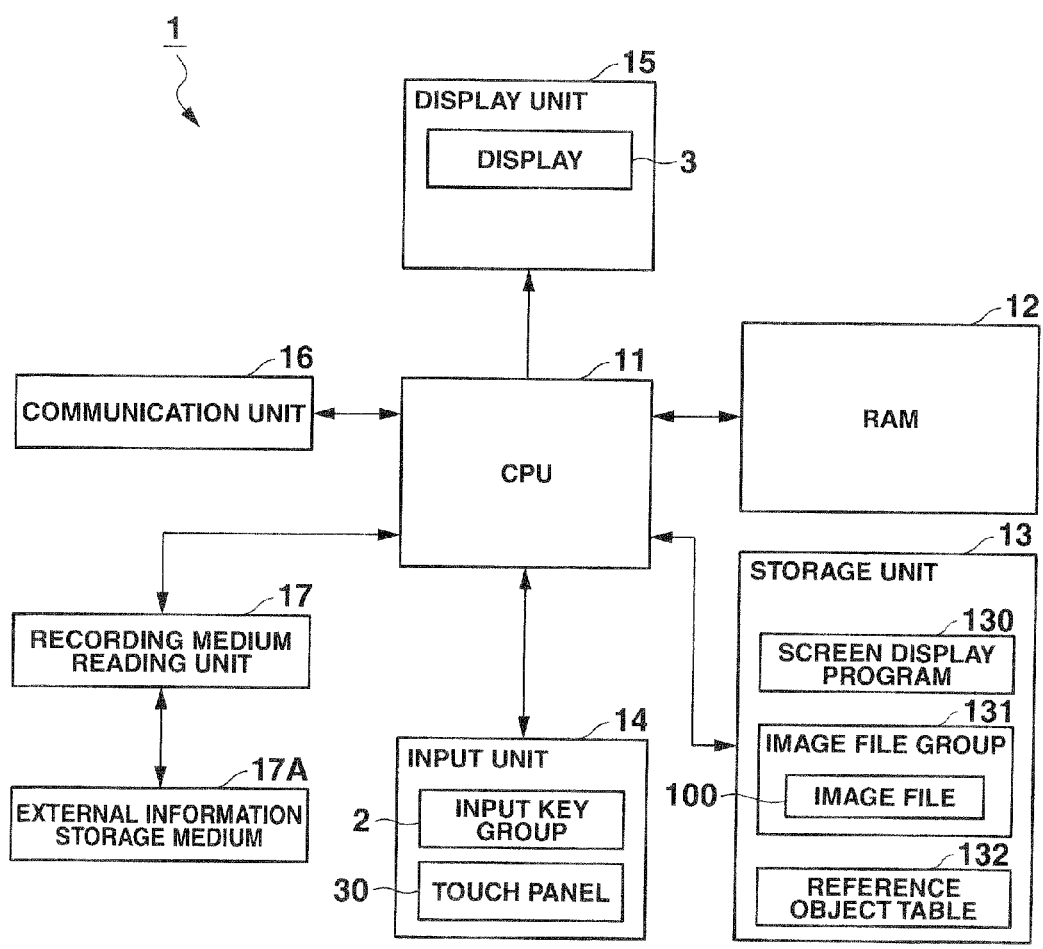
FIG. 2 is a block diagram showing a functional configuration of the scientific electronic calculator.

FIG. 2 is a block diagram showing an outline of functional configuration of the scientific electronic calculator 1.

As shown in FIG. 2, the scientific electronic calculator 1 includes an input unit 14, a display unit 15, a communication unit 16, a recording medium reading unit 17, a RAM (Random Access Memory) 12, a storage unit 13 and a CPU (Central Processing Unit) 11.

The input unit 14 includes the above-mentioned input key group 2 and the touch panel 30, and outputs signals corresponding to the pushed keys and the pushed positions in the touch panel 30.

The display unit 15 includes the above-mentioned display 3, and displays various types of information according to the display signals from the CPU 11 in the display 3.

The communication unit 16 is connectable to internet, and hereby the communication unit 16 can communicate with an external device which is connected to internet.

The recording medium reading unit 17 is for reading information from an external information storage medium 17A, such as a USB memory, which is detachably inserted.

The RAM 12 is a volatile memory in which information is temporarily stored and includes a plurality of work areas for storing various types of programs to be executed, data according to the various types of programs and the like.

The storage unit 13 is a non-volatile memory constituted of a ROM (Read Only Memory) or the like, and stores various types of programs and data. In particular, the screen display program 130, the image file group 131 and the reference object table 132 are stored in the storage unit 13 as programs according to the present invention.

Figure 3:
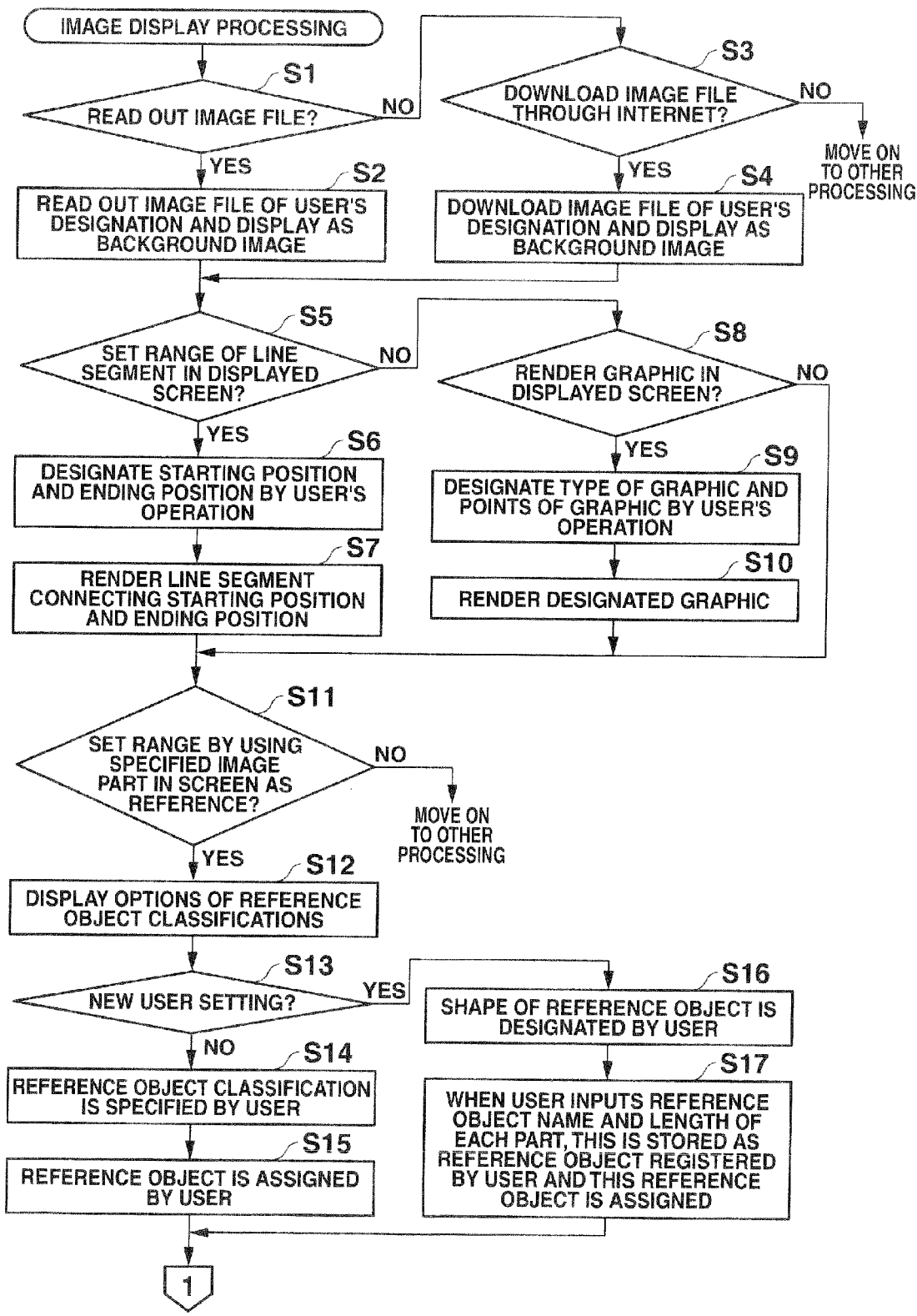
FIG. 3 is a flowchart showing a flow of screen display processing.
Figure 4:
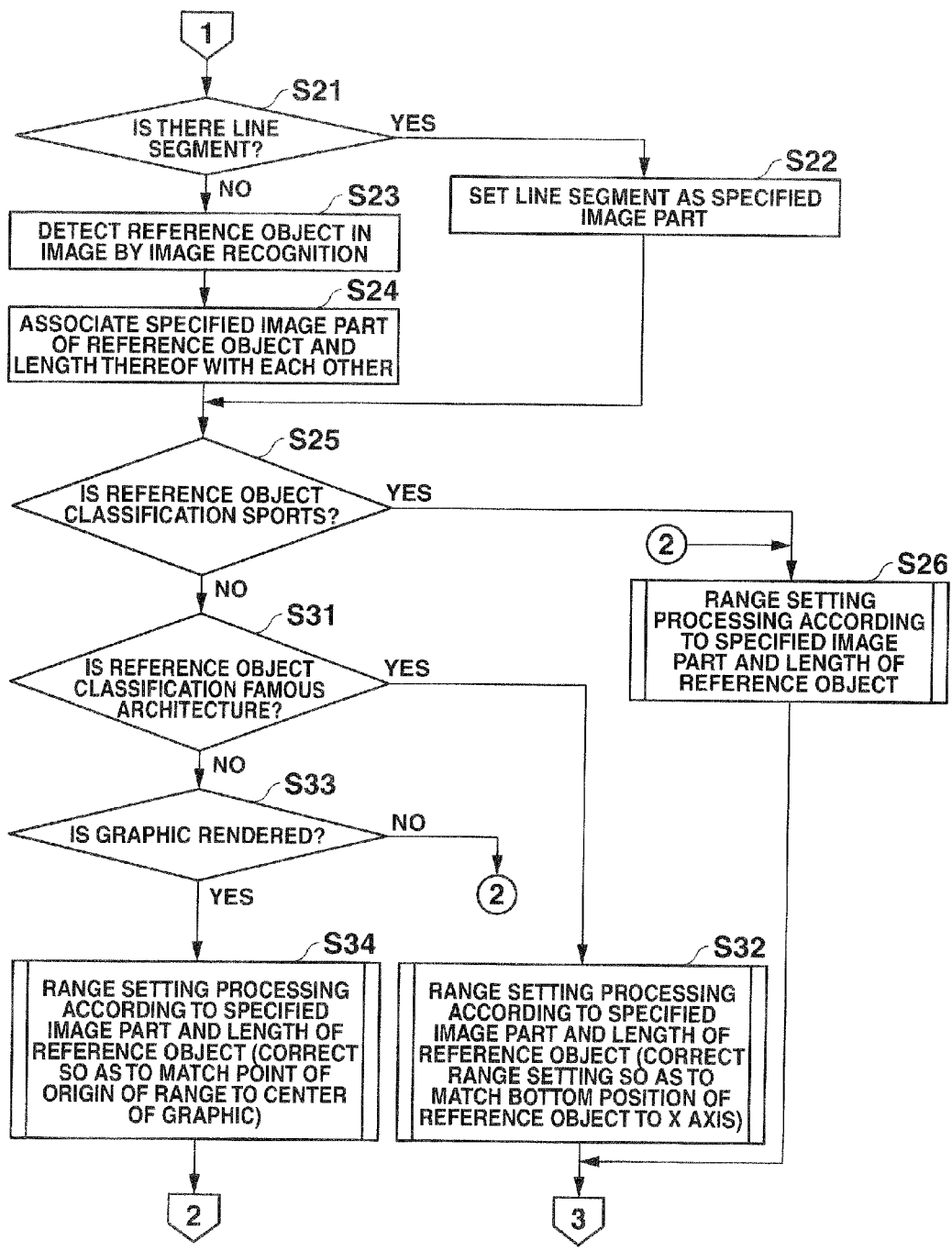
FIG. 4 is a flowchart showing the flow of the screen display processing.
Figure 5:
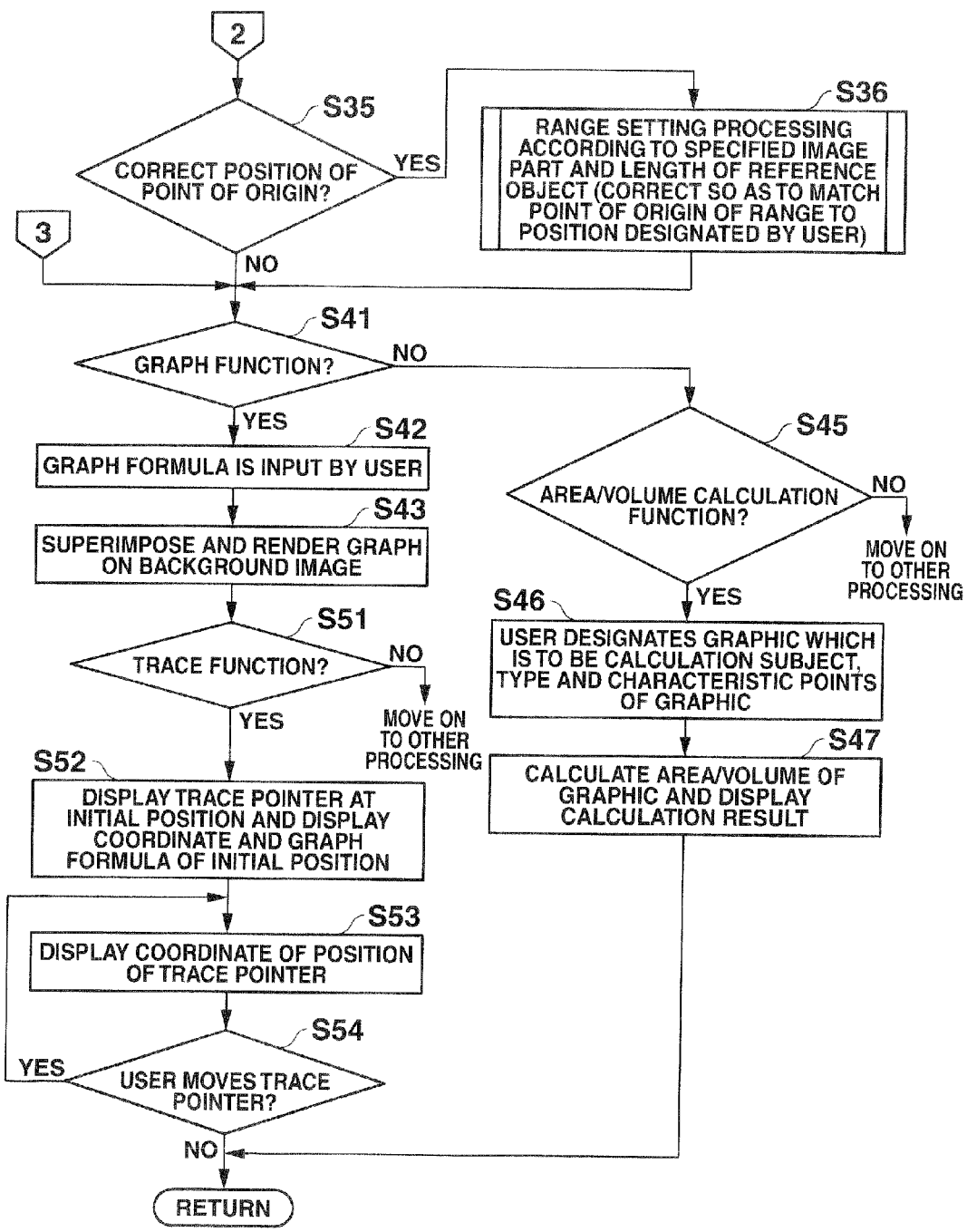
FIG. 5 is a flowchart showing the flow of the screen display processing.

The screen display program 130 is a program to make the CPU 11 execute the after-mentioned screen display processing (see FIGS. 3 to 5).

The image file group 131 stores a plurality of image files 100 regarding images which can be displayed in the display 3. These image files 100 are to be received through the communication unit 16.

The reference object table 132 stores images of a plurality of types of objects as images of reference objects, the images of a plurality of types of objects are to be references for the display range in the X-Y coordinate system (minimum values and maximum values in X-Y coordinate: i.e. Xmin, Xmax, Ymin, Ymax) in the after-mentioned screen display processing (see FIGS. 3 to 5). Further, each of the reference object images is stored in the reference object table 132 in such manner that an actual size (actual length) of a specified part of the reference object is associated with the hierarchical classification of the reference object. Here, the "actual length" which is the actual size is a concept which is to be compared to a length in the display screen, and is the actual length measured by the object in an image such as a photograph to be specific. In the reference object table 132 of this embodiment, "sports", "famous architecture", "JIS standard (Japanese Industrial Standard)", "information registered by a user" and the like are used as roughly divided classification of reference objects. For example, "soccer", "basketball", "volleyball" and so forth are used as more specific classifications within the "sports" category.

The CPU 11 integrally controls each part of the scientific electronic calculator 1. In particular, the CPU 11 expands the system program and a specified program among various types of application programs stored in the storage unit 13 in the RAM 12 and executes various types of processing by cooperating with the programs expanded in the RAM 12.

2. Operation of Scientific Electronic Calculator

Next, operation of the scientific electronic calculator 1 will be described.

FIGS. 3 to 5 are flowcharts for explaining operation of the screen display processing. The screen display processing is executed by the screen display program 130 and the CPU 11 cooperating with each other as a result of the screen display program 130 being read out to the RAM 12 from the storage unit 13 when a user inputs the execution instruction of the screen display processing via the input unit 14.

As shown in FIG. 3, in the screen display processing, the CPU 11 first determines whether a user's operation for reading out an image file 100 in the scientific electronic calculator 1 is performed (step S1). When the CPU 11 determines that the user's operation is performed (step S1; Yes), the CPU 11 reads out the image file (hereinafter, referred to as the specified image file 100S) which is specified by a user among the image files 100 in the scientific electronic calculator 1 and displays the image (hereinafter, referred to as the specified image) in the display 3 as the background (step S2), and thereafter, the CPU 11 moves on to the after-mentioned step S5.

When the CPU 11 determines that the user's operation for reading out an image file 100 in the scientific electronic calculator 1 is not performed in step S1 (step S1; No), the CPU 11 determines whether a user's operation for downloading an image file 100 from internet through the communication unit 16 is performed (step S3). When the CPU 11 determines that the user's operation for downloading an image file 100 from internet through the communication unit 16 is not performed (step S3; No), the CPU 11 moves on to another processing.

Moreover, when the CPU 11 determines that the user's operation for downloading an image file 100 from internet is performed in step S3 (step S3; Yes), the CPU 11 downloads the image file (hereinafter, referred to as the specified image file 100S) which is specified by a user and stores the specified image file 100S in the storage unit 13, and also, the CPU 11 displays the image (hereinafter, referred to as the specified image) in the display 3 as the background (step S4).

Next, the CPU 11 determines whether a user's operation for specifying range of a line segment in the specified image which is displayed in the display 3 is performed (step S5). When the CPU 11 determines that the user's operation for specifying range of a line segment in the specified image is performed (step S5; Yes), the CPU 11 designates the starting position and ending position of the line segment in the specified image according to the user's operation (step S6) and renders the line segment in the specified image by connecting the starting position and the ending position (step S7), and thereafter, the CPU 11 moves on to the after-mentioned step S11. In this embodiment, the description is given assuming that the line segment which is rendered in steps S6 to S7 is rendered with respect to the specific part where the size thereof is stored in the reference object table 132 among the line segments included in the reference object in the specified image.

When the CPU 11 determines that the user's operation for specifying range of a line segment is not to be performed in the above step S5 (step S5; No), the CPU 11 determines whether a user's operation for rendering a graphic (here, a geometric graphic) on the specified image is performed (step S8). When the CPU 11 determines that the user's operation for rendering a graphic on the specified image is not performed (step S8; No), the CPU 11 moves on to the after-mentioned step S11.

When the CPU 11 determines that the user's operation for rendering a graphic on the specified image is performed in step S8 (step S8; Yes), the CPU 11 designates the type of the geometric graphic according to the user's operation and designates the positions of the characteristic points (apices of a triangle, center of a circle and so forth) of the designated geometric graphic (step S9), and renders the geometric graphic according to the designation on the specified image (step S10).

Next, the CPU 11 determines whether a user's operation for setting a display range in coordination system by using the specified part in the specified image as a reference is performed (step S11). When the CPU 11 determines that the user's operation for setting a display range in coordination system by using the specified part in the specified image as the reference (step S11; No), the CPU 11 moves on to another processing.

When the CPU 11 determines that the user's operation for setting a display range in coordination system by using the specified part in the specified image as the reference is performed in step S11 (step S11; Yes), the CPU 11 displays the classifications of reference objects stored in the reference object table 132 and the option "new user registration" to instruct registration of a reference object which is a new type (step S12). In this embodiment, names of rough classifications and specific classifications are sequentially displayed in hierarchical order as the classifications of reference objects.

Then, the CPU 11 determines whether the option "new user registration" is selected (step S13). When the CPU 11 determines that the option "new user registration" is not selected (step S13; No), the CPU 11 determines the classification of the reference object according to the user's operation following the classifications in the reference object table 132 (step S14). Thereafter, the CPU 11 assigns a particular object (for example, a tool used in the sport when the option "sports" is selected) belonging to the designated classification as the reference object (step S15), and then, the CPU 11 moves to the after-mentioned step S21 as shown in FIG. 4. In step S15 of this embodiment, the reference object which is assigned is to be superimposed and displayed on the specified image and arrows are to be displayed to indicate the specific parts (the parts where the lengths thereof are stored in the reference object table 132) of the reference object. Here, a user can select a part corresponding to any one of the arrows as the after-mentioned specified image part. Further, when the reference object is to be superimposed and displayed on the specified image, the CPU 11 may display the specified image which is now the background in a light color or in black and white.

When the CPU 11 determines that the option "new user registration" is selected in the above step S13 (step S13; Yes), the CPU 11 makes the display 3 display options of shapes, and thereafter, specifies any one of the shapes according to a user's operation (step S16) as shown in FIG. 3.

Next, when a user inputs the name and size of the object in specified shape, the CPU 11 assumes that the object in the specified shape is the reference object, assumes that the subject parts where the sizes thereof are input are the specified parts of the reference object and assumes that the input sizes are the length of the specified parts, and stores the reference object, the specified parts and the lengths of the specified parts in the reference object table 132 in such manner that the reference object, the specified parts and the lengths of the specified parts are associated with each other, and also, assigns the object as the reference object (step S17).

Next, the CPU 11 determines whether a line segment is rendered in the specified image (step S21) as shown in FIG. 4. When the CPU 11 determines that a line segment is rendered (step S21; Yes), the CPU 11 sets the line segment as the specified image part (step S22), and thereafter, moves on to the after-mentioned step S25. Here, the specified image part is a part which indicates the length which becomes the reference for a display range of coordination system.

When the CPU 11 determines that a line segment is not rendered in the specified image in step S21 (step S21; No), the CPU 11 performs the image recognition processing to the specified image and detects the reference object which is assigned in the above step S15 in the specified image (step S23).

Next, the CPU 11 sets a predetermined part in the detected reference object as the specified image part and reads out the length of the specified image part from the reference object table 132 to make the length of the specified image part and the specified image part in the specified image be associated to each other (step S24). In particular, when the reference object is a famous architecture, for example, the CPU 11 sets the part which is from the bottom to the apex of the architecture as the specified image part in step S24.

Next, the CPU 11 determines whether the classification of the reference object is "sports" (step S25). When the CPU 11 determines that the classification is "sports" (step S25; Yes), the CPU 11 performs the range setting processing according to the specified image part and the length of the reference object (step S26).

Figure 6:
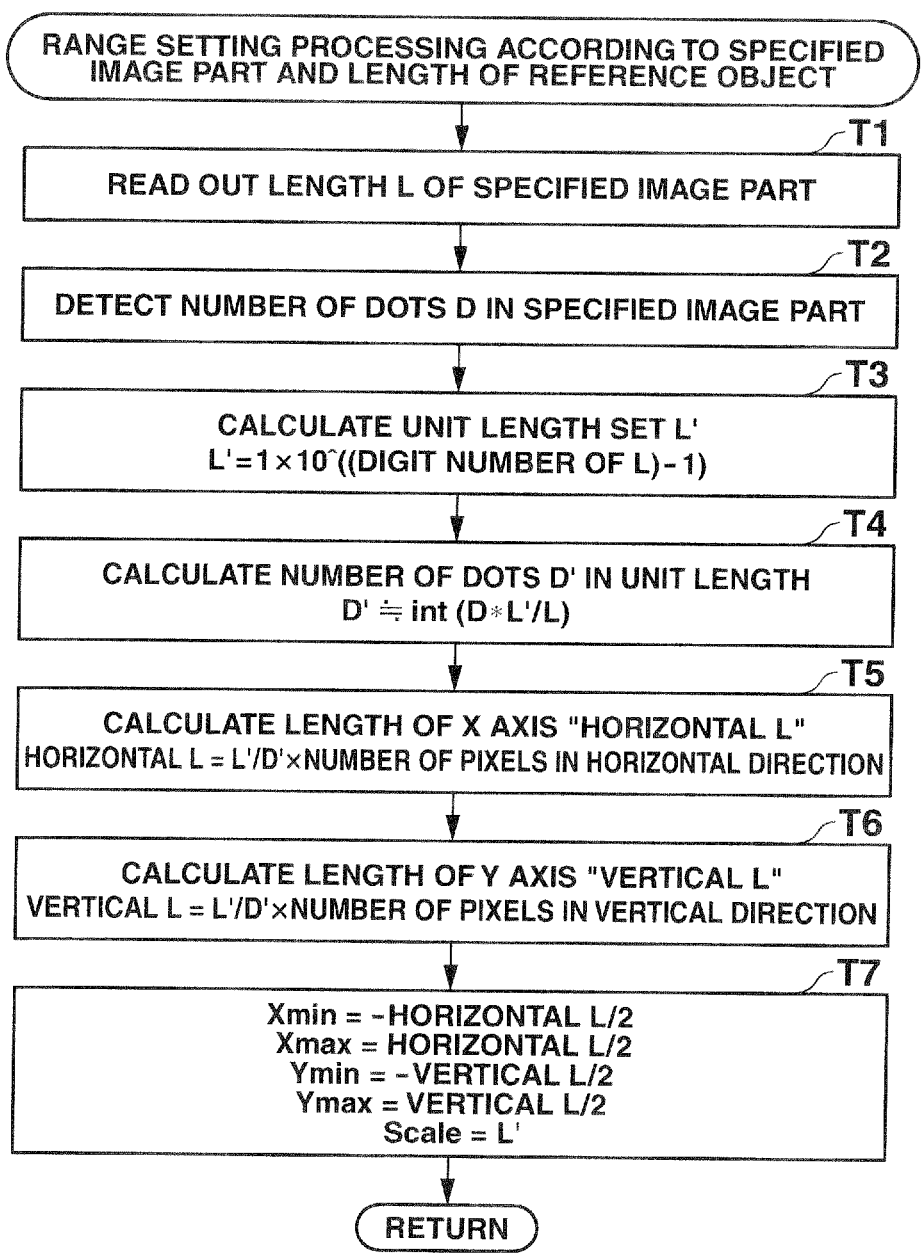
FIG. 6 is a flowchart showing a flow of range setting processing according to a specified image part and the length of a reference object.

In particular, the CPU 11 first reads out the length "L" of the specified image part from the reference object table 132 (step T1) and detects the number of dots "D" in the specified image part in the display 3 (step T2) in the range setting processing as shown in FIG. 6.

Next, the CPU 11 calculates the unit length set "L'" ($=1 \times 10^{(digit\ number\ of\ L-1)}$) for converting the numeral value unit in coordination system into meter (m) (step T3) and calculates the number of dots "D'" of unit length ($\approx$int (D×L'/L)) (step T4).

Next, the CPU 11 calculates the length of X axis (horizontal axis) "horizontal L" (=L'/D'×the number of pixels in horizontal direction) (step T5) and calculates the length of Y axis (vertical axis) "vertical L" (=L'/D'×the number of pixels in vertical direction) (step T6). Here, the number of pixels in horizontal direction and the number of pixels in vertical direction mean the total number pixels in horizontal direction and vertical direction, respectively, in the specified image which is displayed in the display 3.

Then, the CPU 11 calculates the minimum value Xmin (=−horizontal L/2) and the maximum value Xmax (=horizontal L/2) of the X axis, the minimum value Ymin (=−vertical L/2) and the maximum value Ymax (=vertical L/2) of the Y axis and the scale interval Scale (=L'). Further, the CPU 11 sets the coordinate system by superimposing the coordinate system on the specified image by using the calculated display range (Xmin, Xmax, Ymin, Ymax) and the scale interval Scale (step T7) and ends the range setting processing. Thereafter, the CPU 11 moves on to the after-mentioned step S41 as shown in FIGS. 4 and 5. In such way, the display range of coordinate system is set based on the actual length of the specified image part in the specified image.

Moreover, when the CPU 11 determines that the classification of the reference object is not "sports" in the above step s25 (step S25; No), the CPU 11 determines whether the classification of the reference object is "famous architecture" (step S31) as shown in FIG. 4. When the CPU 11 determines that the classification of the reference object is "famous architecture" (step S31; Yes), the CPU 11 performs the range setting processing similar to the above step S26 (step S32), and thereafter, moves on to the after-mentioned step S41 as shown in FIG. 5. In this range setting processing of step S32, the CPU 11 calculates the minimum value Ymin (=−vertical L/2) and the maximum value Ymax (=vertical L/2) of Y axis in step T7, and then, matches the X axis (Y=0) to the bottom position of the reference object and corrects the display range of the Y axis.

Moreover, when the CPU 11 determines that the classification of the reference object is not "famous architecture" in the above step S31 (step S31; No), the CPU 11 determines whether a geometric graphic is rendered on the specified image (step S33) as shown in FIG. 4. When the CPU 11 determines that a geometric graphic is not rendered (step S33; No), the CPU 11 moves on to the above mentioned step S26.

When the CPU 11 determines that a geometric graphic is rendered on the specified image in step S33 (step S33; Yes), the CPU 11 performs the range setting processing similar to the above step S26 (step S34). In the range setting processing of step S34, the CPU 11 calculates the minimum value Xmin (=−horizontal L/2) and the maximum value Xmax (=horizontal L/2) of the X axis and the minimum value Ymin (=−vertical L/2) and the maximum value Ymax (=vertical L/2) of the Y axis in step T7, and corrects the display range of the X axis and Y axis so that the center of the graphic positions at the point of origin.

Next, the CPU 11 determines whether a user's operation to instruct correction of the position of the point of origin is performed (step S35) as shown in FIG. 5. When the CPU 11 determined that the user's operation to instruct correction of the position of the point of origin is not performed (step S35; No), the CPU 11 moves on to the after-mentioned step S41.

When the CPU 11 determines that the user's operation to instruct correction of the position of the point of origin is performed in step S35 (step S35; Yes), the CPU 11 performs the range setting processing similar to the above step S26 (step S36). In the range setting processing of step S36, the CPU 11 calculates the minimum value Xmin (=−horizontal L/2) and the maximum value Xmax (=horizontal L/2) of the X axis and the minimum value Ymin (=−vertical L/2) and the maximum Ymax (=−vertical L/2) of the Y axis in step T7, and corrects the display range of the X axis and Y axis so that the point of origin positions at the position designated by a user.

Next, the CPU 11 determines whether a user's operation to instruct execution of graph function is performed (step S41). When the CPU 11 determines that the user's operation to instruct execution of graph function is performed (step S41; Yes), the CPU 11 inputs a graph formula according to a user's operation (step S42) and thereafter, superimposes the graph of the input graph formula on the specified image and renders the superimposed image in the display 3 (step S43).

Next, the CPU 11 determines whether a user's operation to instruct execution of trace function is to be performed (step S51). When the CPU 11 determines that the user's operation to instruct execution of trace function is not performed (step S51; No), the CPU 11 moves on to another processing.

When the CPU 11 determines that the user's operation to instruct execution of trace function is performed in step S51 (step S51; Yes), the CPU 11 displays the graph formula of the graph in the display 3, and also, displays a trace pointer T (see FIG. 9) at the initial position on the graph and displays the coordinate thereof (step S52). Here, the initial position of the trace pointer T can be any corresponding point on scale in X axis or the corresponding point of the maximum value (Xmax) or the minimum value (Xmin) in the display range of X axis among the points on the graph, for example.

Next the CPU 11 displays the X-Y coordinate of the trace pointer T in the lower part of the display 3 once again (step S53).

Next, the CPU 11 determines whether the moving operation is to be performed to the trace pointer T (step S54). When the CPU 11 determines that the moving operation is performed to the trace pointer T (step S54; Yes), the CPU 11 moves the trace pointer T on the graph in the direction designated by the operation and moves on to the above-mentioned step S53. On the other hand, when the CPU 11 determines that the moving operation is not performed to the trace pointer T (step S54; No), the CPU 11 ends the screen display processing.

When the CPU 11 determines that the user's operation to instruct execution of graph function is not performed in step S41 (step S41; No), the CPU 11 determines whether a user's operation to instruct execution of area/volume calculation function is performed (step S45). When the CPU 11 determines that the user's operation to instruct execution of area/volume calculation function is not performed (step S45; No), the CPU 11 moves on to another processing.

When the CPU 11 determines that the user's operation to instruct execution of area/volume calculation function is performed in step S45 (step S45; Yes), the CPU 11 designates a graphic which is subject to the calculation based on user's operation from geometric graphics which are already rendered (step S46). Here, the CPU 11 may newly designate a type of graphic and positions of characteristic points of the graphic based on user's operation and may render the geometric graphic according to the designation on the specified image and assign this graphic as a calculation subject.

Then, the CPU 11 calculates the area or volume of the assigned graphic according to the values of coordination axes and displays the calculation result in the display 3 (step S47), and thereafter, the CPU 11 ends the screen display processing.

3. Operation Example

Next, the above described operation will be explained specifically with reference to the drawings.

Operation Example (1)

Figure 7A:
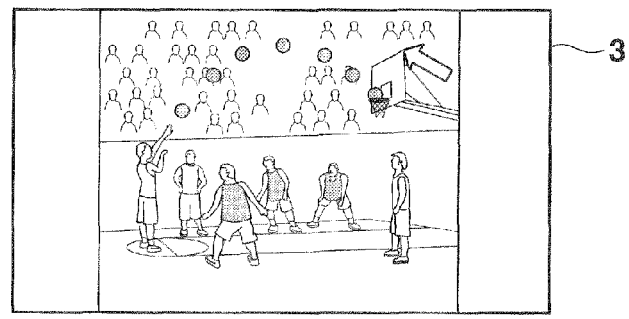
FIGS. 7A to 7E are diagrams showing display contents of a display.

First, when a user performs an operation for reading out the image files 100 in the scientific electronic calculator 1 (step S1; Yes) and specifies the image file 100 which is an image regarding basketball, the specified image of the specified image file 100S is to be displayed as the background in the display 3 as shown in FIG. 7A (step S2).

Figure 7B:
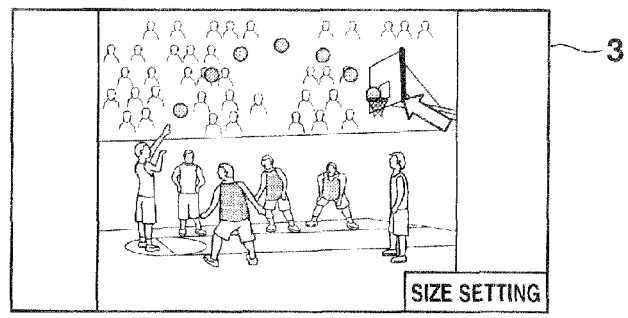

Next, when a user performs an operation for designating the range of a line segment in the specified image which is displayed in the display 3 (step S5; Yes) and designates the starting position and the ending position of the line segment in the specified image (step S6), the line segment connecting between the starting position and the ending position is to be rendered in the specified image as shown in FIG. 7B (step S7). In this example, the line segment is rendered on the right side edge of the board of the hoop.

Next, when a user performs an operation for setting the display range of coordinate system by using the specified part in the specified image as a reference (step S11; Yes), the classifications of the reference object "sports", "famous architecture" and so forth which are stored in the reference object table 132 and the option "new user registration" for instructing registration of new type of reference object are to be displayed (step S12) as shown in FIG. 7C.

Figure 7C:
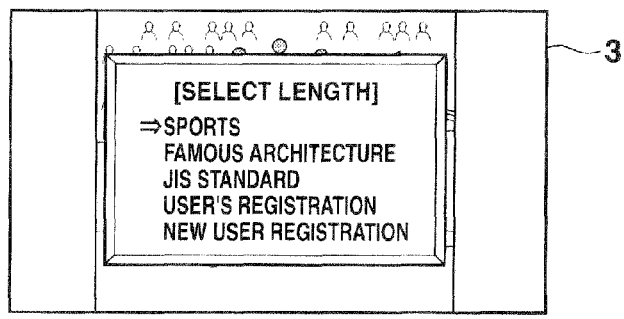
Figure 7D:
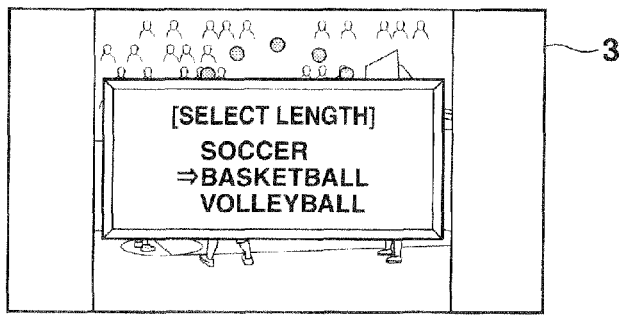
Figure 7E:
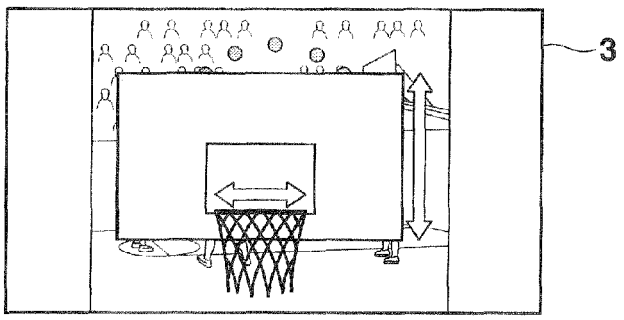

Next, a user sequentially specifies the classification "sports" and then the classification "basketball" and the like of the reference object according to the classifications in the reference object table 132 (step S14) as shown in FIGS. 7C and 7D. Thereafter, when a user assigns a particular object (here, basket hoop) which belongs to the classification "basketball" which is the specified option as the reference object (step S15), the assigned reference object is to be superimposed and displayed on the specified image and double-headed arrows are to be displayed at the specified parts (the parts where the lengths thereof are stored in the reference object table 132) in the reference object as shown in FIG. 7E.

Next, whether the line segment is rendered in the specified image is determined (step S21; Yes) and the line segment is set as the specified image part (step S22).

Next, after the classification of the reference object is determined as being "sports" (step S25; Yes), the length "L" of the specified image part (right side edge of the board of the basket hoop) is read out from the reference object table 132 (step T1) and the number of dots "D" in the specified image part in the display 3 is to be detected (step T2).

Then, the unit length set "L'" ($=1\times10^{(digit\ number\ of\ L-1)}$) is calculated (step T3) and also, the number of dots "D'" in the unit length ($\approx int(D\times L'/L)$) is calculated (step T4).

Next, when the length of X axis "horizontal L" (=L'/D'×the number of pixels in horizontal direction) is calculated (step T5), the length of Y axis "vertical L" (=L'/D' X the number of pixels in vertical direction) is calculated (step T6).

Figure 8A:
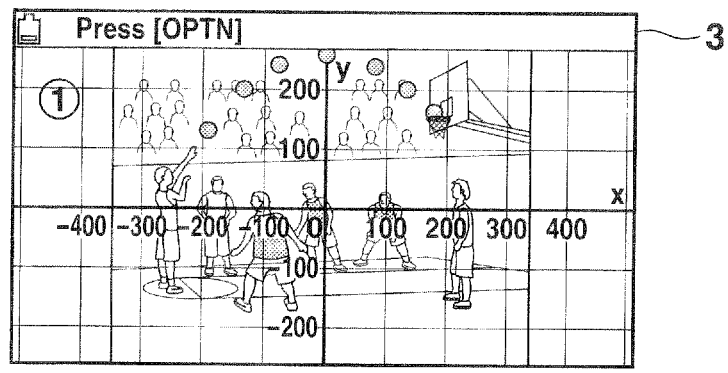
FIGS. 8A to 8C are diagrams showing display contents of a display.

Then, the minimum value Xmin (−505.263) and the maximum value Xmax (=505.263) of X-axis, the minimum value Ymin (−252.631) and the maximum value Ymax (=252.631) of Y axis and the scale interval Scale (=100) are calculated, and the coordinate system is to be superimposed and set on the specified image by using the display range (Xmin, Xmax, Ymin, Ymax) and the scale interval Scale which are calculated (step T7) as shown in FIG. 8A.

Figure 8B:
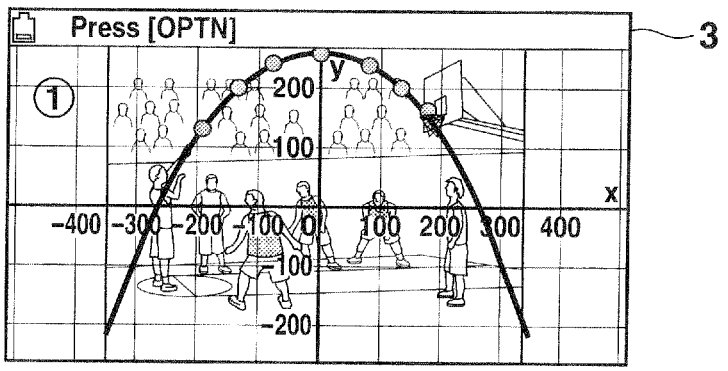

Next, when a user performs an operation to instruct execution of graph function (step S41; Yes) and the graph formula is input (step S42), the graph of the input graph formula is to be superimposed on the specified image and displayed in the display 3 (step S43) as shown in FIG. 8B.

Figure 8C:
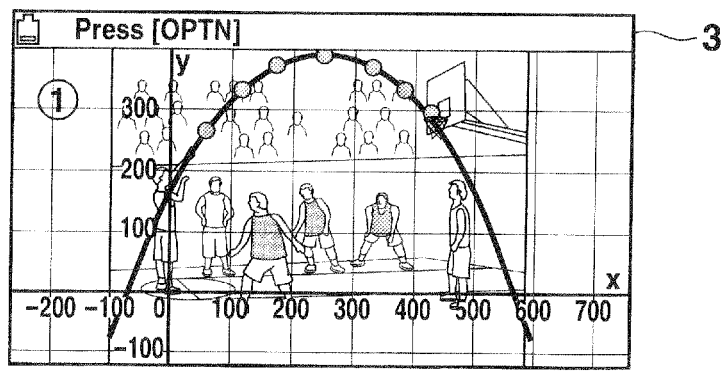

Further, when a user performs an operation instructing to correct the position of the point of origin in a state as shown in FIG. 8A (step S35; Yes), the display range of X axis and Y axis is corrected so that the point of origin positions at the position designated by a user (step S36) as shown in FIG. 8C.

Next, when a user performs an operation to instruct execution of graph function (step S41; Yes) and input the graph formula "Y1=−0.004(X−230)²+390" (step S42), the graph of the input graph formula "Y1=−0.004(X−230)²+390" is to be superimposed on the specified image and rendered in the display 3 (step S43).

Figure 9A:
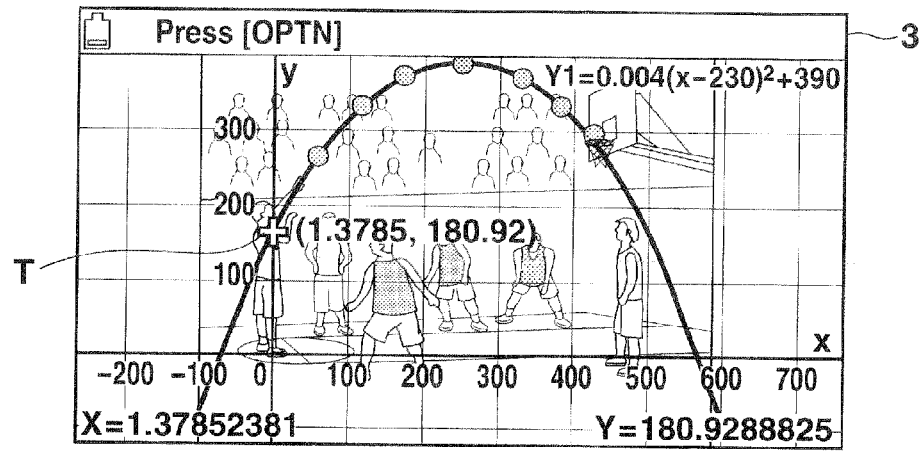
FIGS. 9A to 9C are diagrams showing display contents of a display.

Next, when a user performs an operation to instruct execution of trace function (step S51; Yes), the graph of the graph formula "Y1=−0.004(X−230)²+390" is to be displayed in the display 3 and also, a tracing point T is to be displayed at the initial position on the graph and the coordinate "(1.3785, 180.92)" is displayed (step S52) as shown in FIG. 9A.

Figure 9B:
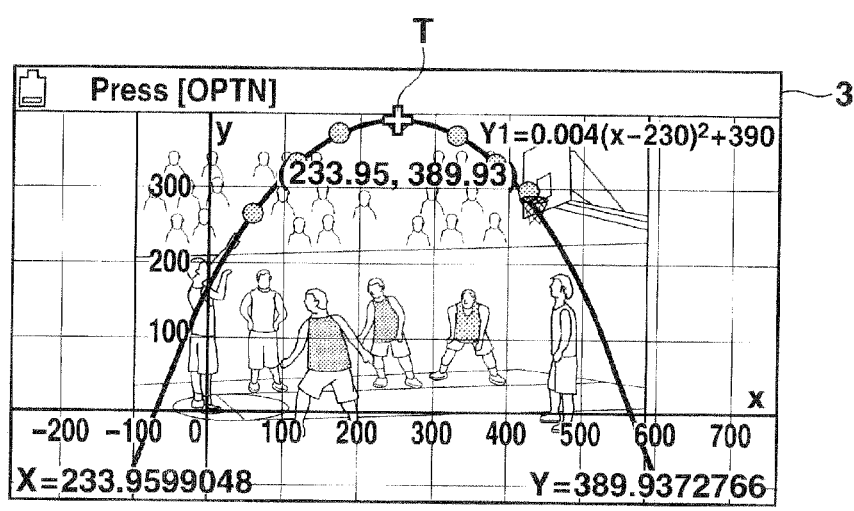
Figure 9C:
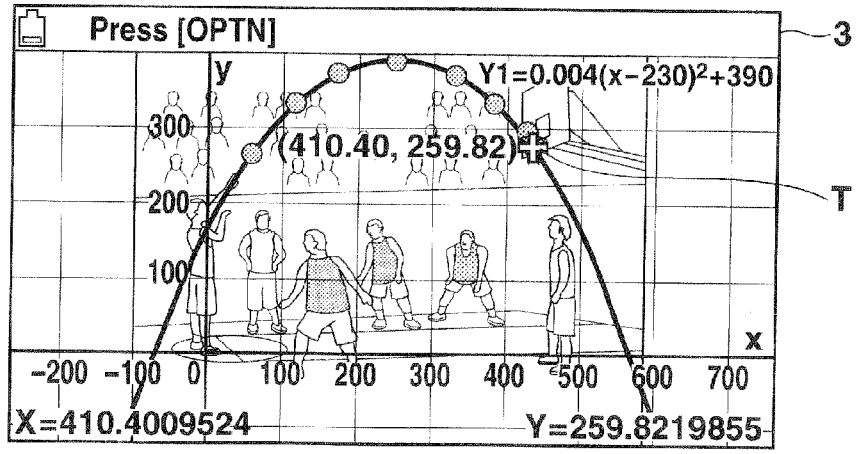

When a user performs a moving operation with respect to the trace pointer T (step S54; Yes), the trace pointer T moves on the graph in the direction designated by the user's operation and the coordinate of the destination of the trace pointer T is to be displayed (step S53) as shown in FIGS. 9B and 9C.

Operation Example (2)

Figure 10A:
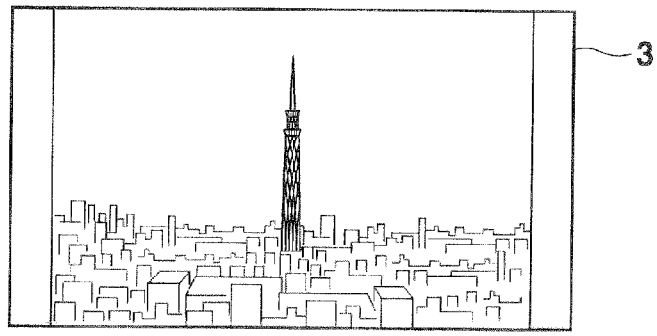
FIGS. 10A to 10D are diagrams showing display contents of a display.

First, when a user performs an operation for downloading an image file 100 through internet (step S3; Yes) and specifies the image file 100 of Tokyo Sky Tree, the specified image of the specified image file 100S is to be displayed as the background in the display 3 (step S4) as shown in FIG. 10A.

Figure 10B:
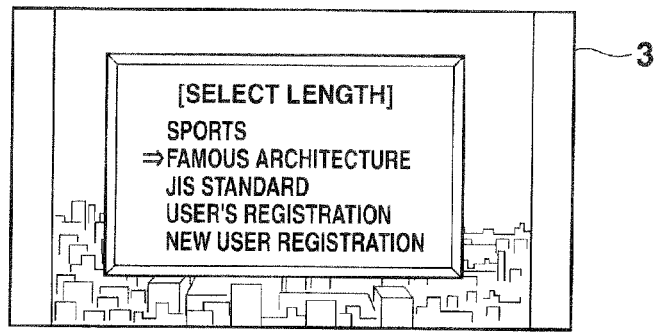
Figure 10C:
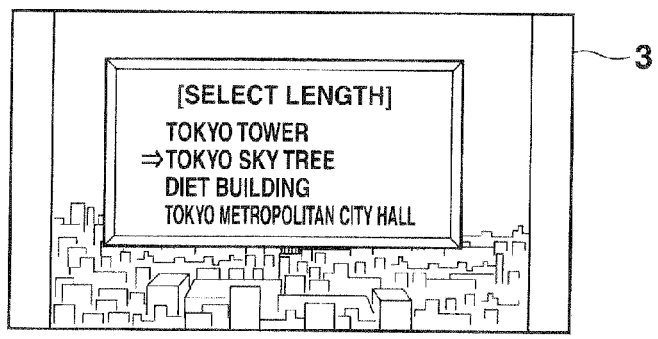
Figure 10D:
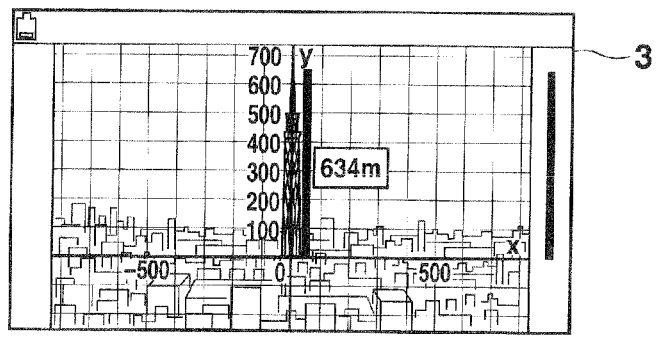

Next, when a user performs an operation for setting a display range of coordinate system by using a particular part in the specified image as a reference (step S11; Yes), the classifications "sports", "famous architecture" and so forth of the reference objects which are stored in the reference object table 132 and the option "new user registration" for instructing registration of new type of reference object are to be displayed (step S12) as shown in FIG. 10B.

Next, after a user specified the classification "famous architecture" or the like of the reference object according to the classifications in the reference object table 132 (step S14), a particular object (here, Tokyo Sky Tree) belonging to the specified classification option is to be assigned as the reference object (step S15).

Next, it will be determined that a line segment is not rendered on the specified image (step S21; No), and the image recognition processing will be performed to the specified image and the assigned reference object (Tokyo Sky Tree) is to be detected in the specified image (step S23).

Next, a predetermined part (here, the bottom to apex of Tokyo Sky Tree) in the detected reference object is to be set as the specified image part and also, the length (634 m) of the specified image part is readout from the reference object table 132 and is made to be associated to the specified image part in the specified image (step S24).

Next, after the classification of the reference object being determined as "famous architecture" (step S31; Yes), the length "L" (634 m) of the specified image part (from the bottom to apex of Tokyo Sky Tree) is read out from the reference object table 132 (step T1) and also, the number of dots "D" (here, 147 dots) in the specified image part in the display 3 is detected (step T2).

Next, the unit length set "L'" ($=1\times10^{(digit\ number\ of\ L-1)}$ here, 100) is calculated (step T3) and also, the number of dots "D'" in the unit length (int(D×L'/L) is calculated (step T4).

Then, the length of X axis (horizontal axis) "horizontal L" (=L'/D'×the number of pixels in horizontal direction, here, 164) is calculated (step T5) and the length of Y axis "vertical L" (=L'/D'×the number of pixels in vertical direction, here, 822) is calculated (step T6).

Next, after the minimum value Xmin (=−822.47) and the maximum value Xmax (=822.47) of X axis, the minimum value Ymin (=−411) and the maximum value Ymax (=411) of Y axis and the scale interval Scale (=100) are calculated, the display range of Y axis is corrected to the minimum value Ymin (=−107) and the maximum value Ymax (=715) by matching the X axis (Y=0) to the bottom position of the reference object and the coordinate system is to be superimposed and set on the specified image by using the above display range (Xmin, Xmax, Ymin, Ymax) and the scale interval Scale (step T7).

Figure 11A:
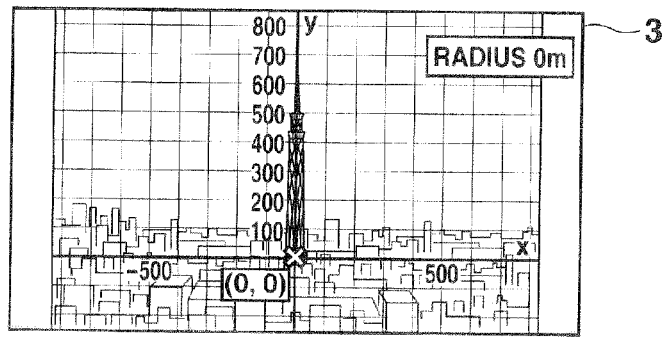
FIGS. 11A to 11D are diagrams showing display contents of a display.
Figure 11B:
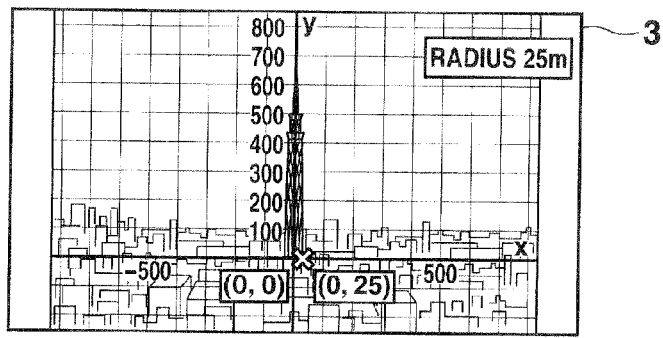
Figure 11C:
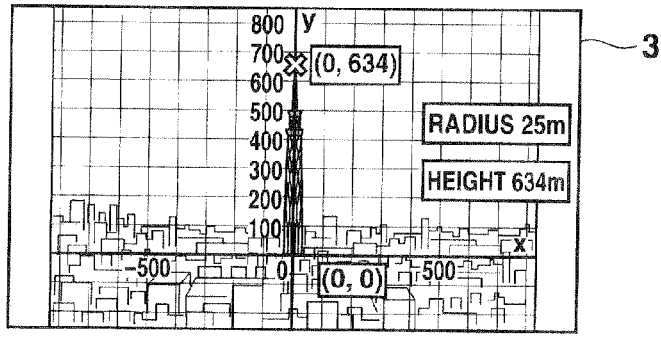

Next, when a user performs an operation to instruct execution of area/volume calculation function (step S45; Yes) and designates a new graphic type (here, circular cone) and the positions of characteristic points in the graphic (center point of the bottom, circumference, apex), the geometric graphic according to the designation is to be rendered on the specified image and the graphic is to be assigned as the target for calculation (step S46). Here, FIG. 11A is a diagram showing a state where the center point of the bottom of the circular cone is designated, FIG. 11B is a diagram showing a state where the circumference of the bottom is designated, and FIG. 11C is a diagram showing a state where the apex is designated.

Figure 11D:
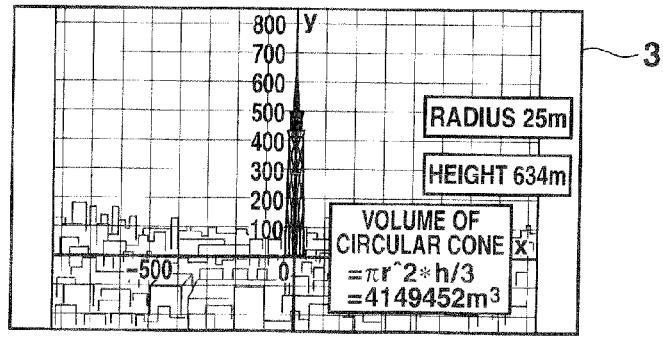

Then, the volume of the assigned graphic is calculated according to the values of the coordinate axes and the calculation result is to be displayed in the display 3 as shown in FIG. 11D (step S47).

Operation Example (3)

Figure 12A:
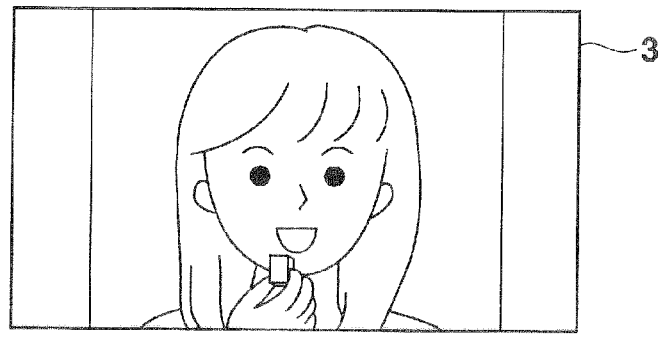
FIGS. 12A to 12D are diagrams showing display contents of a display.

First, when a user performs an operation for downloading an image file 100 through internet (step S3; Yes) and specifies the image file 100 of an idol (pop star), the specified image of the specified image file 100S is to be displayed as the background in the display 3 as shown in FIG. 12A (step S4).

Figure 12B:
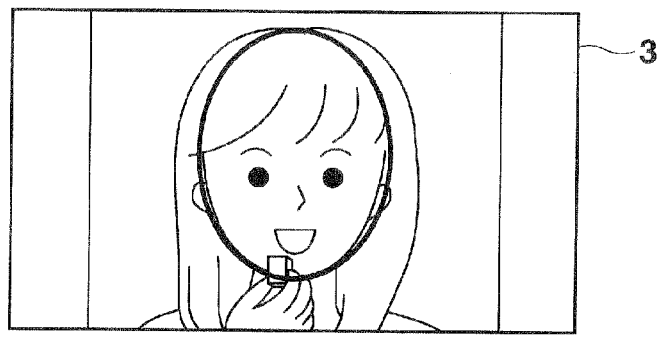

Next, when a user performs an operation for rendering a graphic on the specified image (step S8; Yes), designates the type of the geometric graphic (here, an oval) and designates positions of characteristic points (focus point or the like) of the designated geometric graphic (an oval) (step S9), the geometric graphic according to the designation is to be rendered on the specified image (step S10) as shown in FIG. 12B. In this operation example, the description will be given assuming that an oval is to be rendered so as to match the face of the idol (pop star).

Figure 12C:
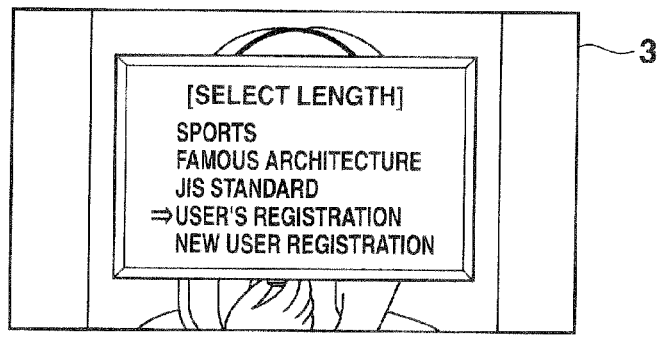

Next, when a user performs an operation for setting a display range of the coordinate system by using a particular part in the specified image as a reference (step S11; Yes), the classifications "sports", "famous architecture" and so forth of the reference objects which are stored in the reference object table 132 and the option "new user registration" for instructing registration of new type of reference object are to be displayed (step S12) as shown in FIG. 12C.

Figure 12D:
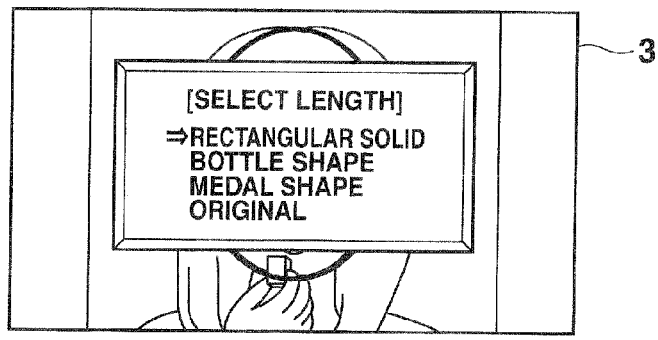

Next, when a user selects the option "new user registration" (step S13; Yes), the options "rectangular solid", "bottle shape" and so forth of shapes are to be displayed in the display 3 and a user designates the "rectangular solid" shape (step S16) as shown in FIG. 12D.

Figure 13A:
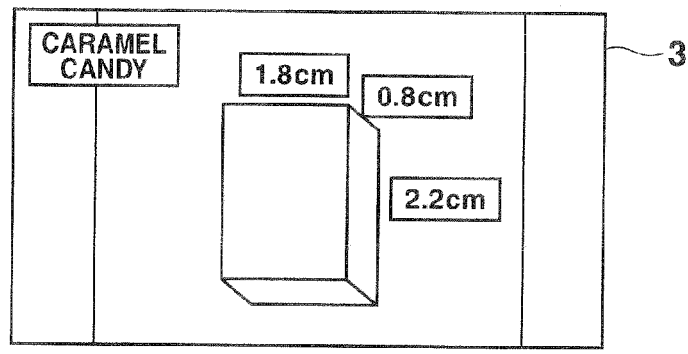
FIGS. 13A to 13C are diagrams showing display contents of a display.

Next, when a user inputs a name (caramel candy) of the object in the designated shape, the object in the designated shape is assumed as the reference object and a part where the size thereof is input is assumed as the specified part of the reference object and the input size is assumed as the length of the specified part as shown in FIG. 13A, and further, the reference object, the specified part and the length of the specified part are made to be associated to each other to be stored in the reference object table 132 and the object is to be assigned as the reference object (step S17).

Then, the image recognition processing is performed to the specified image, and the reference object (caramel candy) which is assigned in the above step S17 is to be detected in the specified image (step S23).

Next, a predetermine part (here, a side edge of the caramel candy) in the detected reference object is to be set as the specified image part and also, the length of the specified image part is read out from the reference object table 132 to be associated to the specified image part in the specified image (step S24).

Next, after it is determined that the geometric graphic is rendered on the specified image (step S33; Yes), the length "L" of the specified image part (one side edge of the caramel candy) is to be read out from the reference object table 132 (step T1) and the number of dots "D" in the specified image part in the display 3 is to be detected (step T2).

Then, the unit length set "L'" ($=1 \times 10^{(\text{digit number of } L-1)}$) is calculated (step T3) and also, the number of dots "D'" in the unit length ($\approx$ int (D×L'/L)) is calculated (step T4).

Next, when the length of X axis "horizontal L" (=L'/D'×the number of pixels in horizontal direction) is calculated (step T5), the length of Y axis "vertical L" (=L'/D'×the number of pixels in vertical direction) is calculated (step T6).

Figure 13B:
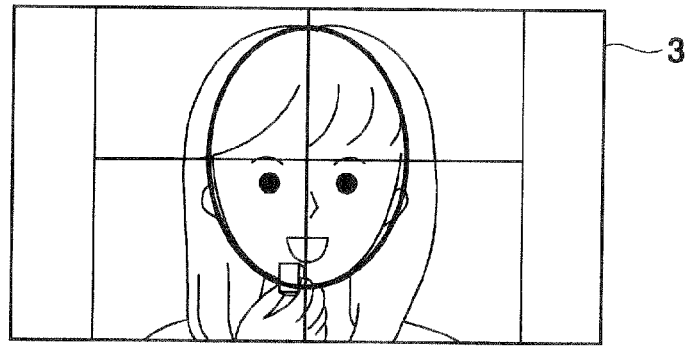

Then, after the minimum value Xmin and the maximum value Xmax of X axis, the minimum value Ymin and the maximum value Ymax of Y axis and the scale interval Scale are calculated, the display range of X axis and Y axis is corrected by matching the point of origin to the center of the oval, and further, the coordinate system is superimposed and set on the specified image using the display range (Xmin, Xmax, Ymin, Ymax) and the scale interval Scale (step T7) as shown in FIG. 13B.

Figure 13C:
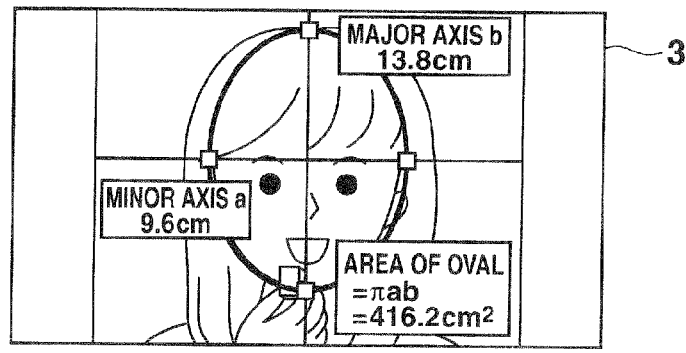

Next, when a user performs an operation to instruct execution of area/volume calculation function (step S45; Yes) and designates the geometric graphic (oval) which is already rendered as the calculation subject (step S46), the area of the designated graphic is to be calculated according to the values of the coordination axes and the calculation result is to be displayed in the display 3 (step S47) as shown in FIG. 13C. Here, in the drawing, the long and short diameters of the oval are displayed.

Figure 14A:
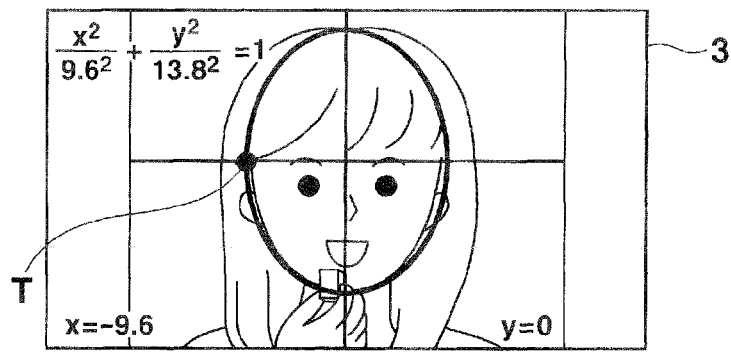
FIGS. 14A to 14C are diagrams showing display contents of a display.

Moreover, when a user performs an operation to instruct execution of graph function (step S41; Yes) and inputs the graph formula "$x^2/9.6^2+y^2/13.8^2=1$" (step S42) in a state shown in FIG. 13B, the graph of the input graph formula "$x^2/9.6^2+y^2/13.8^2=1$" is to be superimposed on the specified image and rendered in the display 3 (step S43) as shown in FIG. 14A.

Next, when a user performs an operation to instruct execution of trace function (step S51; Yes), the graphic of graph formula "$x^2/9.6^2+y^2/13.8^2=1$" is to be displayed in the display 3, and also, the trace pointer T is to be displayed at the initial position on the graph and the coordinate "(−9.6, 0)" thereof is to be displayed (step S52).

Figure 14B:
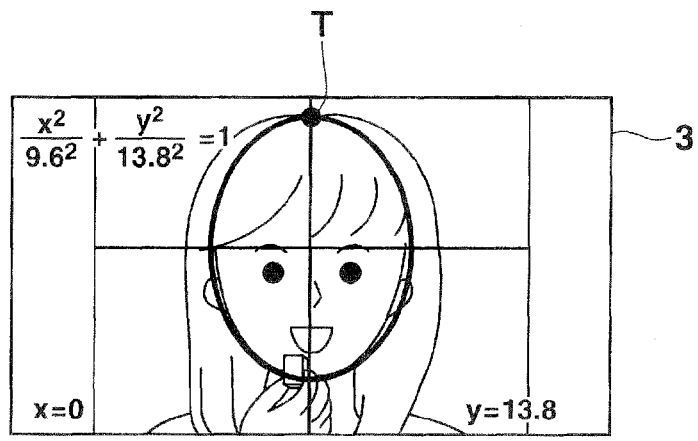
Figure 14C:
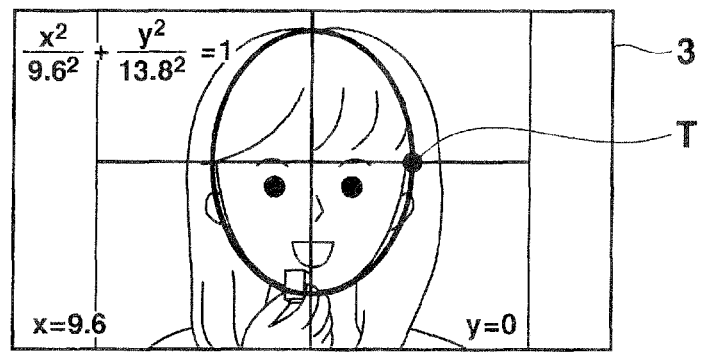

Thereafter, when a user performs moving operation to the trace pointer T (step S54; Yes), the trace pointer T moves on the graph in the direction designated by the operation and the coordinate thereof is to be displayed (step S53) as shown in FIGS. 14B and 14C.

As described above, according to the embodiment, as shown in steps S23 to S26 of FIG. 4, step S43 of FIG. 5, FIGS. 7A to 14C and so forth, at least one specified part in each predetermined reference object and the actual length of the specified part are made to be associated to each other and stored, the specified part of the reference object in the specified image is detected and is set as the specified image part when the specified image which is specified based on the user's operation is displayed, the coordinate system which is defined by a plurality of coordinate axes is to be superimposed and set on the specified image and the display range of the coordinate system is to be set based on the actual length of the specified image part in the specified image, and then, a graphic is to be superimposed and displayed on the specified image based on a user's operation. Therefore, the image and the graphic can be superimposed on each other so as to match to be displayed by setting the display range which corresponds to the size of the object in the image.

Further, as shown in steps S16 and S17 of FIG. 3, FIGS. 13A to 13C and so forth, when a given shape and the length of any one part included in the shape are made to be associated to each other and input based on the user's operation, the object in the input shape is assumed as the reference object, the subject part where the length thereof is input is assumed as the specified part of the reference object, the input length is assumed as the length of the specified part, and the specified part of the reference object and the length of the specified part are made to be associated to each other and stored. Therefore, a length of a reference object in a given shape can be newly stored to be used.

Here, regarding detail structure and detail operations of the configuration components of the scientific electronic calculator 1 in the above embodiment, it is needless to say that they can be changed appropriately within the scope of the invention.

For example, the graphic display device according to the present invention is described as the scientific electronic calculator 1. However, the application of the present invention is not limited to the above product, and the present invention can be applied to electronic devices in general including cellular phones, personal computers, PDA (Personal Digital Assistant), game devices and so forth. Furthermore, the screen display program 130 according to the present invention may be stored in a memory card, a CD or the like which is detachable to the scientific electronic calculator 1.

Moreover, it is described that the reference object of the type which is designated by the user's operation is detected in the specified image in step S15. However, the CPU 11 may detect any of the reference objects, which are stored in the reference object table 132, in the specified image by image recognition.

Moreover, it is described that the vertical axis is Y axis and the horizontal axis is X axis in the coordinate system. However, other coordinate axis names can be used. Further, the description is given assuming that the coordinate system is the orthogonal coordinate system. However, other types of coordinate systems such as an oblique coordinate system, a polar coordinate system or the like can be used.

In the above, embodiments of the present invention are described. However, the scope of the invention is not limited to the above described embodiments, and includes the scope of the invention recited in claims and the equivalents thereof.

What is claimed is:

1. A graphic display apparatus, comprising:
   a display unit;
   a reference object length storage unit in which specified parts of reference objects and actual lengths of the specified parts are stored in such manner that the specified parts and the actual lengths of the specified parts are associated to each other;
   an image storage unit in which a plurality of images are stored;
   an image display control unit which displays on the display unit, an image from among the plurality of images stored in the image storage unit;
   a size detecting unit which detects an image length of a specified part of a reference object in the displayed image;
   an actual length setting unit which sets a display range of a coordinate system defined by coordinate axes based on the image length of the specified part and an actual length of the specified part so that a specified image part in the image is a coordinate range in the actual length of the specified part;
   a graphic display control unit which superimposes and displays a graphic on the specified image based on a user's operation; and
   an actual length value display control unit which displays a coordinate value in actual length of a point on the graphic based on a user's operation.

2. The graphic display apparatus as claimed in claim 1, further comprising:
   a reference object classification storage unit in which classifications of the reference objects are stored;
   a reference object assigning unit which assigns any one of the reference objects according to a user's operation following the classifications stored in the reference object classification storage unit; and
   a reference object detection unit which detects the reference object which is assigned by the reference object assigning unit in the specified image.

3. The graphic display apparatus as claimed in claim 1, further comprising a reference object detection unit which detects the reference object in the specified image by detecting an image of the reference object stored in the reference object length storage unit by an image recognition,
   wherein in the reference object length storage unit, images of the reference objects, specified parts of the reference objects and the actual lengths of the specified parts are stored in such a manner that the images of the reference objects, the specified parts of the reference objects and the actual lengths of the specified parts are associated to each other.

4. The graphic display apparatus as claimed in claim 1, wherein when an architecture is the reference object in the specified image, a part which is from a bottom to an apex of the architecture is set as the specified image part, and the actual length setting unit sets the display range of the coordinate system so that a horizontal axis matches the bottom of the architecture.

5. The graphic display apparatus as claimed in claim 1, further comprising:
   a reference object setting unit which sets a given shape as the reference object based on a user's operation;
   an actual length input unit which inputs an actual length of a specified part of the reference object based on a user's operation; and
   a reference object length registration unit which, according to the reference object set by the reference object setting unit and the actual length of the specified part of the reference object which is input by the actual length input unit, registers the specified part of the reference object and the actual length of the specified part in the reference object length storage unit in such manner that the specified part and the actual length of the specified part are associated to each other.

6. The graphic display apparatus as claimed in claim 1, wherein the graphic display control unit displays a graph as the graphic and displays a graph formula which expresses the graph.

7. The graphic display apparatus as claimed in claim 6, wherein the actual length value display control unit is an actual size trace control unit which displays a trace pointer on the graph, moves the trace pointer on the graph according to a user's operation, and displays coordinate values of the trace pointer in actual size.

8. A graphic display method of a graphic display apparatus comprising a display unit, the method comprising:
- storing specified parts of reference objects and actual lengths of the specified parts in association with each other;
- storing a plurality of images;
- controlling the display unit to display an image from among the stored plurality of images;
- detecting an image length of a specified part of a reference object in the displayed image;
- setting a display range of a coordinate system defined by coordinate axes based on the image length of the specified part and an actual length of the specified part so that a specified image part in the image is a coordinate range in the actual length of the specified part;
- superimposing and displaying a graphic on the specified image based on a user's operation; and
- displaying a coordinate value in actual length of a point on the graphic based on a user's operation.

9. A non-transitory computer readable recording medium having stored thereon a graphic display program for controlling a computer comprising a display unit to function as:
- a reference object length storage unit in which specified parts of reference objects and actual lengths of the specified parts are stored in such manner that the specified parts and the actual lengths of the specified parts are associated to each other;
- an image storage unit in which a plurality of images are stored;
- an image display control unit which displays on the display unit, an image from among the plurality of images stored in the image storage unit;
- a size detecting unit which detects an image length of a specified part of a reference object in the displayed image;
- an actual length setting unit which sets a display range of a coordinate system defined by coordinate axes based on the image length of the specified part and an actual length of the specified part so that a specified image part in the image is a coordinate range in the actual length of the specified part;
- a graphic display control unit which superimposes and displays a graphic on the specified image based on a user's operation; and
- an actual length value display control unit which displays a coordinate value in actual length of a point on the graphic based on a user's operation.

\* \* \* \* \*